July 10, 1962 Z. NACHSI 3,043,387
COMBINED POSTAL SCALE AND PEN
Filed April 15, 1959
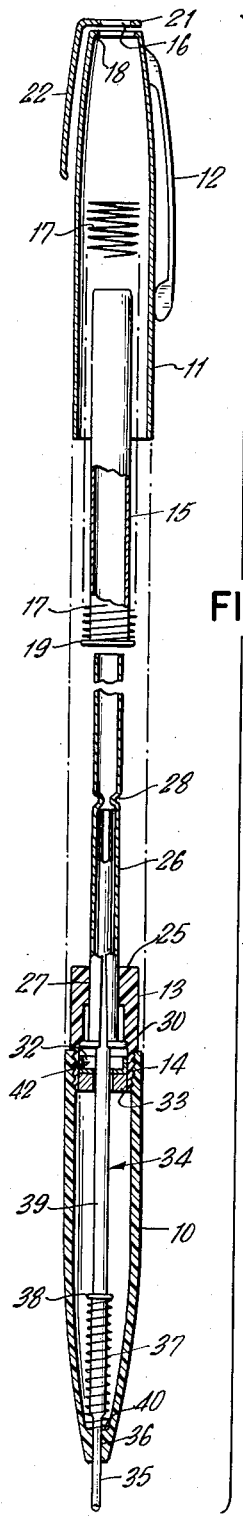
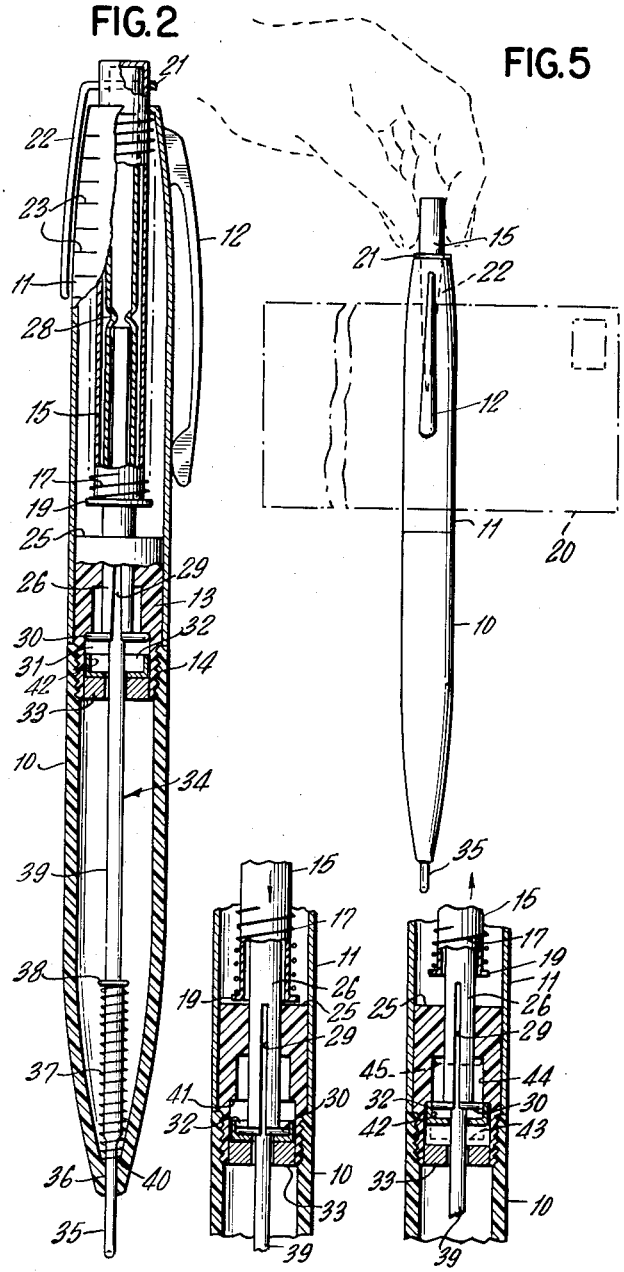
INVENTOR.
ZALMAN NACHSI
BY
ATTORNEY United States Patent Office 3,043,387
Patented July 10, 1962

3,043,387
COMBINED POSTAL SCALE AND PEN
Zalman Nachsi, 630 Bedford Ave., Brooklyn, N.Y.
Filed Apr. 15, 1959, Ser. No. 806,629
4 Claims. (Cl. 177—232)

This invention relates generally to writing instruments and particularly to an improved ball point pen.

It is an object of this invention to provide a ball point pen which may be used for determining the weight of letters, postcards and the like.

Another object of the present invention is to provide a ball point pen which has a simplified means for projection and retraction of its writing element.

A further object of the invention is to provide a ball point pen of inherently simple and economical construction.

Other and further objects of the present invention will be apparent from the following description as read in connection with the accompanying drawing.

In the drawing:

FIGURE 1 is a cross-sectional, partially-exploded view of one embodiment of the invention;

FIGURE 2 is a partially cross-sectional view of one assembled position of the said embodiment of the invention;

FIGURE 3 is a fragmentary cross-sectional view depicting a portion of the mechanism of said embodiment of the invention when its plunger is in a depressed position;

FIGURE 4 is a fragmentary cross-sectional view depicting the said portion of the mechanism of said embodiment of the invention when its plunger is in an elevated position; and FIGURE 5 is an elevational view depicting the employment of this form of the invention for weight determination purposes.

As shown in the accompanying drawing, one embodiment of the invention comprises a tubular body including a pen housing or barrel 10 formed as a tapered cylindrical member of conventional design and a cap 11 provided with a pocket clip 12 of conventional form. The said cap and barrel are connected by a cylindrical bushing 13 frictionally secured in the lower portion of the cap and threadedly engaged with internal threads 14 formed at the upper portion of the barrel.

A hollow plunger 15 is disposed axially within said cap and projects through an aperture 16 formed at the top of the cap. The plunger is yieldably biased against vertical displacement by a coil spring 17 surrounding said plunger and seated between an internal shoulder 18 formed annularly of said aperture and an annular flange 19 formed on the lower end of the plunger.

The bias of the coil spring is such that if the weight of the pen is supported by the plunger, the said spring bias will be sufficient to prevent the remaining portion of the pen from being lowered with respect to the plunger. However, if an additional weight be added to the pen, as for example, the letter 20 depicted in FIGURE 5, the said remaining portion of the pen will be lowered to a position corresponding with the said additional weight.

On the periphery of that portion of the plunger which projects externally of the cap there is a frictionally retained ringlike flange 21 integral with a vertical pointer 22. This pointer extends into the vicinity of the external periphery of the cap which is provided with a series of horizontal graduations 23, as shown in FIGURE 2.

With this arrangement, the invention may be used for weight determination purposes in the following manner. Thus, as depicted in FIGURE 5, a letter to be weighed may be secured between the pocket clip and the cap. The pen is then suspended by the projecting end of the plunger, as shown in said figure, whereupon the letter and the remaining portion of the pen will be lowered to a point determined by the weight of the letter.

At the same time, the lower end of the said vertical pointer will be disposed in the vicinity of one of the said horizontal graduations. Since the latter may be calibrated in suitable units of weight, the weight of the letter may be read merely by noting the position of the lower end of the vertical pointer with respect to the said graduations.

It is also to be noted that the ringlike flange may be adjusted vertically on said plunger, thereby raising or lowering the vertical pointer. In this manner, variations in the spring bias of the coil spring, which may occur over a period of time, may be compensated for by suitable displacement of the vertical pointer on the plunger, thereby maintaining the weight indicating accuracy of the said pointer.

It will also be seen that the downward displacement of the aforesaid plunger is limited by its flange which abuts against the upper face 25 of the cylindrical bushing.

An important feature of the invention resides in its means for advancing its writing means into projected position, maintaining it thereat and retracting it. To provide these means a hollow cylinder 26 is slidably secured within the upper axial bore 27 of said cylindrical bushing and extends upwardly into the plunger. The upper portion of the hollow cylinder is formed with a constricted neck 28 and is contactable with the upper internal end of the plunger. The lower portion of the hollow cylinder is formed with one or more slots 29 and terminates in a beaded flange 30, the said beaded flange being normally urged outwardly towards said bushing.

As may be seen in FIGURE 2, the said beaded flange is springably biased against the internal periphery of an expanded lower axial bore 31 formed in the lower portion of said bushing. Below said beaded flange, a cylindrical cup 32 is slidably secured within the lower axial bore and is contactable with the upper face of a cylindrical plug 33 frictionally retained at the bottom of the said lower axial bore.

Within the hollow cylinder, there is axially disposed writing means including an ink-containing writing cartridge, generally designated by the numeral 34, which has a writing point 35 projectable through an aperture 36 formed at the lower end of the barrel and is provided with a coiled compression spring 37 seated between an annular flange 38 formed on the shank 39 of the cartridge and an internal annular shoulder 40 formed in the vicinity of the said aperture at the lower end of the barrel. The said coiled compression spring urges the cartridge against projection through the said aperture and towards the constricted neck of the hollow cylinder, thereby tending to exert a continual pressure upon the hollow cylinder which, in turn, transmits said pressure to the plunger so as to maintain the latter in a projected position.

When the plunger is depressed, as by manual pressure, it will force the hollow cylinder downward, and the constricted neck of the latter will move the writing cartridge into a projected position. This position is depicted in FIGURE 2. The projection of the cartridge is retained by the abutment of the beaded flange against the annular shoulder 41 at the top of the lower axial bore, thereby determining the position of the constricted neck and the cartridge in contact therewith.

The retraction of the writing cartridge may be accomplished in the following manner: When the plunger is depressed, as by manual pressure exerted upon the upper projecting end of the plunger, the beaded flange will be lowered into contact with the upper end of the cylindrical cup. Upon the exertion of further pressure, the beaded flange will be compressed until its overall diameter corresponds with the diameter of the mouth of the cup. In this position the said beaded flange may then be forced into the cup as shown in FIGURE 3 where it will be frictionally secured in contact with the internal periphery 42 of the cup.

Upon release of said pressure, the coiled compression spring will force the plunger to rise, as shown in FIGURE 4, and the cup to be carried upwards from the position shown in said figure in dotted lines, and indicated by the numeral 43, to the position therein depicted in solid lines where it abuts against the shoulder of the lower axial bore. Since the force of the coiled compression spring is sufficient to overcome the friction between the beaded flange and the internal periphery of the cup, said flange will be raised to the mouth of said cup, as shown in FIGURE 4. Moreover, since the diameter of the mouth of the cup is equal to the diameter of an intermediate axial bore 44 formed in the cylindrical bushing, the beaded flange will be carried upwardly within said intermediate axial bore until it comes to rest in the position shown in dotted lines in FIGURE 4 and indicated by the numeral 45. In this position, the writing cartridge will be fully retracted within the barrel since the hollow cylinder will have moved upwards with the plunger, by reason of the force transmitted to the constricted neck by the coiled compression spring acting on the writing cartridge, and hence, the constricted neck having assumed an elevated position, the writing cartridge, retained in contact therewith by said spring, will also assume an elevated position.

When it is desired to project the cartridge again for writing purposes, the plunger may be depressed so as to force the beaded flange below the intermediate axial bore where it will expand against the periphery of the lower axial bore, to the position illustrated in FIGURE 2.

The described embodiment of the invention is simple, ingenious and accomplishes the objects of the invention in an expeditious manner.

If disassembly of the device be desired, as for replacement of the writing cartridge, this may be accomplished by unscrewing the barrel from the cylindrical bushing and sliding the cartridge out of assembly with the hollow cylinder, cup and plug. If further disassembly be desired, the cap may be forced out of frictional engagement with the cylindrical bushing, as shown in FIGURE 1, thereby exposing the various parts contained therein.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:
1. In a ballpoint pen having a tubular body, writing means axially slidable within the body between a projected position wherein said writing means extends from one end of said body and a retracted position in which said writing means is retracted into said body, spring means within said body urging said writing means to said retracted position, and means operable on said writing means to advance the latter from said retracted to said projected position thereof against the bias of said spring means, said advancing means being mounted for reciprocation within said body at the other end thereof, said advancing means being in releasable abutment with said writing means and having one end thereof projecting through said other end of the body for manual depression of said advancing means into said body to project said writing means from said first-mentioned end of the body, that improvement which comprises second spring means operable to bias said advancing means toward said first-mentioned end of the body, the bias of said second spring means being such that if the weight of said pen is supported by the projecting end of said advancing means, said last mentioned bias will be sufficient to prevent the remaining portion of said pen from being lowered with respect to said advancing means in the absence of an object suspended from the body and means for locating the position of the advancing means with respect to the pen body whereby the weight of an object suspended from the body will be indicated in response to the lowering of the pen body in proportion to the weight of said object.

2. A ballpoint pen as in claim 1, said advancing means comprising a tubular member closed at said one end thereof and open at said other end thereof, said writing means extending into said tubular member for normal engagement with said closed end thereof, a flange formed at the other end of said tubular member, and said second spring means being a coiled compression spring mounted on said tubular member and seated between said flange and the other end of said body.

3. A ballpoint pen as in claim 2, said weight indicating means being a pointer provided at the closed end of said tubular member and overlying the pen body and weight indicia provided on said pen body.

4. A ballpoint pen as in claim 2, an opening defined in said other end of said body through which said tubular member extends, the diameter of said flange exceeding the diameter of said opening.

References Cited in the file of this patent
UNITED STATES PATENTS

| | | |
|---|---|---|
| 622,619 | Granat et al. | Apr. 4, 1899 |
| 698,370 | Burrows | Apr. 22, 1902 |
| 739,047 | Wilson | Sept. 15, 1903 |
| 2,097,837 | Kaplan | Nov. 2, 1937 |
| 2,500,439 | Tursky | Mar. 14, 1950 |
| 2,750,926 | Smith | June 19, 1956 |